United States Patent [19]

Kovac

[11] Patent Number: 4,802,433
[45] Date of Patent: Feb. 7, 1989

[54] AMPHIBIOUS VEHICLE

[76] Inventor: Andrew J. Kovac, 4474 Shelby Crescent, Mississauga, Ontario, Canada, L4W 3T3

[21] Appl. No.: 90,951
[22] Filed: Aug. 27, 1987

Related U.S. Application Data

[63] Continuation-in-part of Ser. No. 885,844, Jul. 16, 1986, Pat. No. 4,691,657.

[51] Int. Cl.$^4$ ............................................. B63B 35/00
[52] U.S. Cl. ..................................... 114/270; 114/61
[58] Field of Search ................ 114/61, 270, 282, 345, 114/348, 371; 280/414.5; 296/157; 14/2.4, 2.6

[56] References Cited

U.S. PATENT DOCUMENTS

| | | | |
|---|---|---|---|
| 3,172,134 | 3/1965 | Livingstone | 114/61 |
| 3,930,461 | 1/1976 | Brock et al. | 440/62 |
| 4,294,184 | 10/1981 | Heinrich | 114/345 |

Primary Examiner—Joseph F. Peters, Jr.
Assistant Examiner—Jesus D. Sotelo
Attorney, Agent, or Firm—Ridout & Maybee

[57] ABSTRACT

An amphibious vehicle is provided with a watertight hull and pontoons for flotation of the vehicle in a body of water. At least one pontoon is positionable along each side of the vehicle. At least two pivoting arms are associated with each laterally extending pontoon for the purpose of moving each pontoon from a stored position atop the vehicle to an operating position laterally alongside the vehicle. Each arm has one end attached to the pontoon and the other end is provided with apparatus for moving the arm approximately 180° about a pivot so that the pontoon may be moved into the desired position.

4 Claims, 4 Drawing Sheets

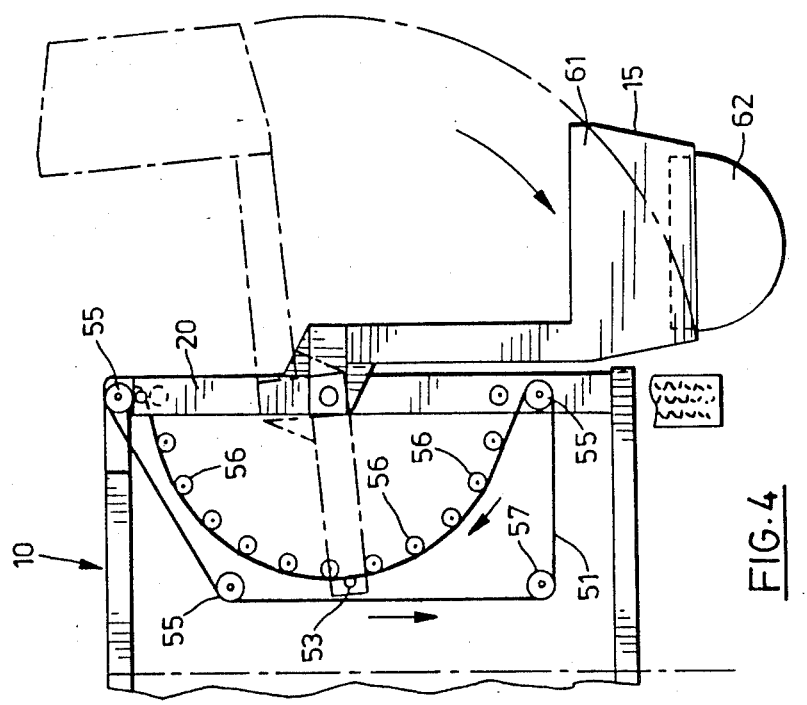
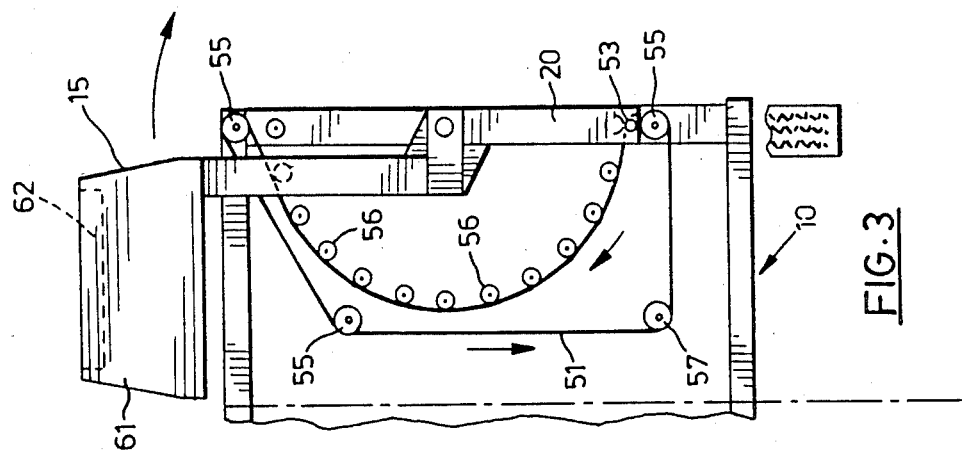
FIG. 4
FIG. 3

AMPHIBIOUS VEHICLE

This application is a continuation-in-part of Ser. No. 885,844 filed July 16, 1986 which is now U.S. Pat. No. 4,691,657.

The present invention relates to an amphibious vehicle which may be a trailer or a motorized land vehicle which is provided with pontoons giving flotation assistance to the vehicle when it is in a body of water. The pontoons of the present vehicle are movable from a stowed position atop the vehicle to an operating position alongside the vehicle.

Accordingly, the invention provides an amphibious vehicle which comprises a frame provided with wheels for transporting the vehicle on land. A body is attached to the frame having a watertight lower portion enabling the vehicle to float in a body of water. The vehicle is equipped with pontoons to provide flotation in a body of water. At least one pontoon is positionable along each side of the vehicle. At least two pivoting arms are associated with each laterally extending pontoon for the purpose of moving each pontoon from a stowed position atop the vehicle to an operating position laterally alongside the vehicle. Each arm has one end attached to the pontoon and the other end is provided with means for moving the arm approximately 180° about a pivot so that the pontoon may be moved into the desired position. Two alternative preferred means for moving the arm are described.

BRIEF DESCRIPTION OF THE DRAWINGS

FIGS. 3 and 4 are sectional detail views showing a second preferred mechanism for moving the pontoons.

Figure 1:
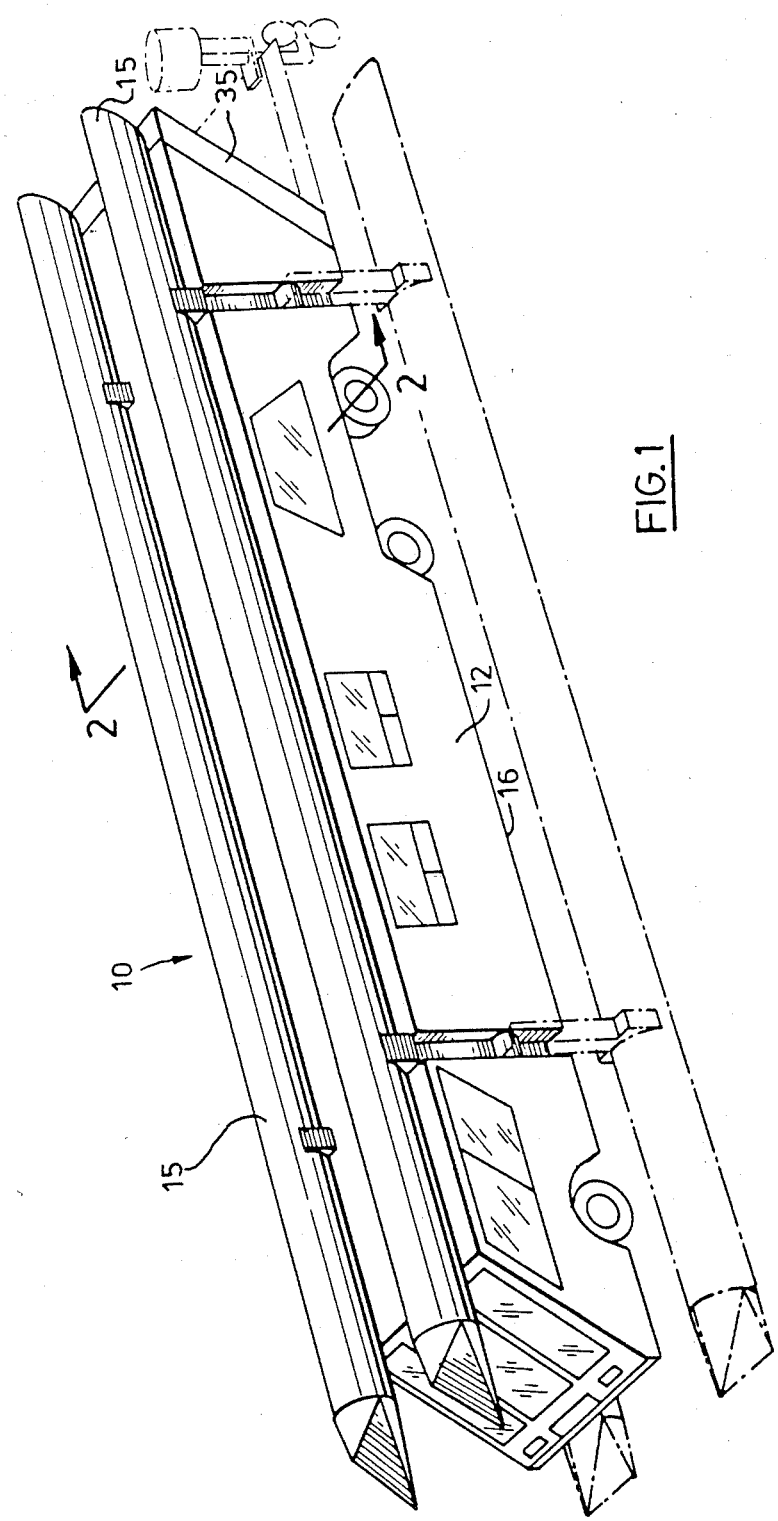
FIG. 1 is a perspective view of a vehicle showing the alternative positions of the pontoons.

An amphibious vehicle 10 in accordance with the present invention is shown in FIG. 1 as a motorized recreational vehicle, but the invention may extend to a trailer or other type of non-motorized land vehicle. The vehicle 10 has a watertight lower body portion 12 which allows the vehicle to float in water. Pontoons 15 are provided laterally along each longitudinal side 16 of the vehicle 10 to serve as the principal means of flotation and stability for the vehicle 10 when it is afloat. The pontoons 15 are shown in the drawings as elongate generally cylindrical members, but as will be clear to those skilled in this art, the pontoons 15 may comprise any of a number of configurations or structures suitable for the purpose of floating and stabilizing the vehicle 10 in a body of relatively calm water.

Figure 2:
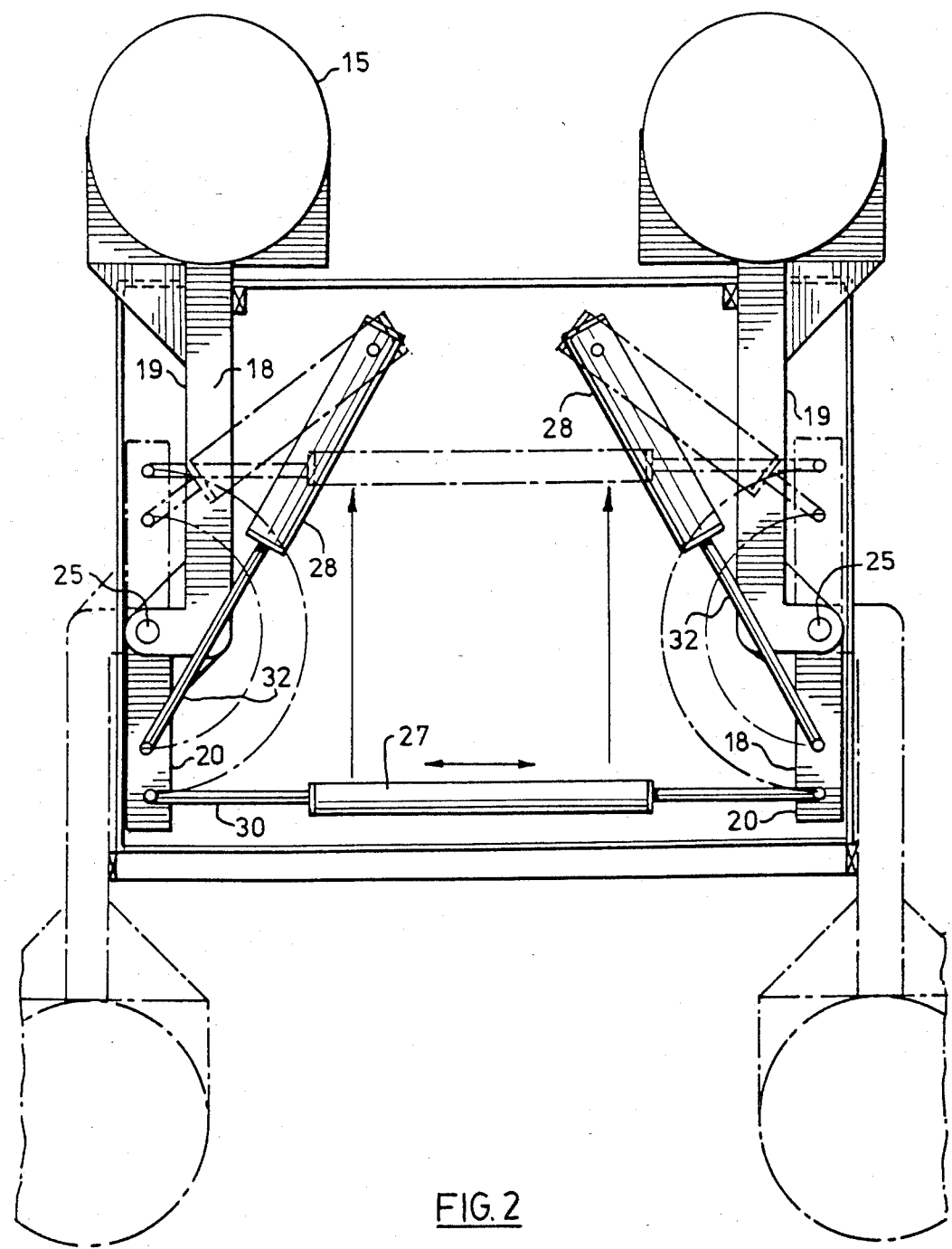
FIG. 2 is a sectional detail showing one preferred mechanism for moving the pontoons from the stowed to the operational positions.

One preferred mechanism for moving the pontoons 15 from a stowed position atop the vehicle 10 to an operational position alongside the vehicle 10 is shown in FIG. 2. Each pontoon 15 is attached to one end of an arm 18 which is pivotable about a pivot 25 with the assistance of mechanical means such as hydraulic or pneumatic cylinders 27 and 28. Each arm 18 comprises a long section 19 attached to the pontoon 15 and a short section 20. The sections 19 and 20 are defined about the pivot 25 and may comprise a unitary structure or separate pieces joined together. As shown in FIG. 2, the arms 18 are preferably shaped with two 90° bends at the area of the pivot 25 so that the pontoons 15 may be located properly upon movement of the arms 18 through 180°.

While there may be several workable arrangements of the cylinders 27 and 28 in relation to the arms 18, the preferred arrangement shown in FIG. 2 provides for a double hydraulic cylinder 27 having actuatable piston rods 30 extending from each end of the cylinder 27 and attached pivotally near the end of the short arm section 20 of each opposing arm 18. Single cylinders 28 have piston rods 32 pivotally attached to each short arm section 20, preferably centrally thereof, with the other end of each cylinder 28 being pivotally located at a suitable angle with respect to the arm 18 so that the cylinder 28 can apply force to the arm 18 substantially throughout the complete 180° range of movement of the arm 18. As shown in FIG. 1, there should be at least two arms 18 and accompanying mechanisms for each pontoon 15.

In operation the cylinders 27 and 28 work together to move the pontoons 15 smoothly from the stowed to the operational positions. In moving the pontoons 15 from the stowed position atop the vehicle 10, the cylinder 27 provides the initial primary motive force to pull the ends of the short arm sections 20 toward one another. Leverage about the pivot 25 causes the pontoons 15 to move off of the vehicle roof and gravity quickly begins to assist the descent of the pontoons 15 to the desired location alongside the vehicle 10. In the descent of the pontoons 15, the cylinders 28 act primarily to brake the downward motion of the pontoons 15 so that the lowering operation is smooth and controlled. Likewise, the cylinder 27 acts to counter the gravitational pull on the pontoons 15 as they descend from the stowed position. As the pontoons 15 enter the water, the cylinders 27 and 28 provide sufficient push on the short arm sections 20 to move the pontoons 15 into the operational positions.

In order to raise the pontoons 15 to the stowed location, the cylinders 27 and 28 act in unison first pulling, and then when at the point of full piston contraction, pushing the short arm sections 20 to move the pontoons 15 against the pull of gravity. The cooperation of the three cylinders 27 and 28 provides a smooth movement of the pontoons 15 from the operational to the stowed positions.

It will be apparent to the person skilled in this art that the smooth operation of the cylinders 27 and 28 will depend on the use of suitable control means for the cylinders 27 and 28. The control means comprise a series of hydraulic flow devices with the necessary sequencing and reference point switches to ensure a smooth and safe movement of the pontoons 15 between the operational and stowed positions. The control means may be electronically governed by means of a microcomputer or chip.

While the watertight lower body portion of the vehicle 10 may be employed to contribute to the buoyancy of the vehicle 10 when in the water with the pontoons 15 deployed, it is preferred to position the pontoons 15 so that they essentially lift the vehicle 10 out of the water. This feature allows the buoyancy of the vehicle body to act as a backup to the pontoons 15.

Conversion of the vehicle 10 from a land vehicle to an aquatic vehicle may be accomplished by driving the vehicle 10 into the water so that it may float by means of its watertight body 12, and then, causing the pontoons 15 to be deployed from the stowed positions atop the vehicle 10 to the operational positions alongside the vehicle 10. The pontoons 15 then provide the principal flotation means for the vehicle 10 which is lifted just out of the water by the pontoons 15. Propulsion of the waterborne vehicle 10 is accomplished by an inboard or outboard motor driven propeller or the like which may be lowered into an operational position when the vehicle 10 first enters the water. Conveniently, propulsion means as well as steering means such as a rudder may be located on a tailgate 35 of the vehicle 10 which may be lowered into the water at the appropriate time.

In this regard, it is preferred that the engine for the vehicle 10 be located toward the rear of the vehicle 10. This inboard engine may be used to power the vehicle 10 for propulsion both on land and in the water. Location of the engine toward the rear of the vehicle 10 is desirable in order to provide a good weight distribution throughout the vehicle 10. Attachment of one or more outboard motors to the lowered tailgate 35 may be used as a supplement to the propulsion provided by the inboard engine. Also, the outboard motors on the tailgate 35 can be used to steer the vehicle 10 in the water.

Figure 5:
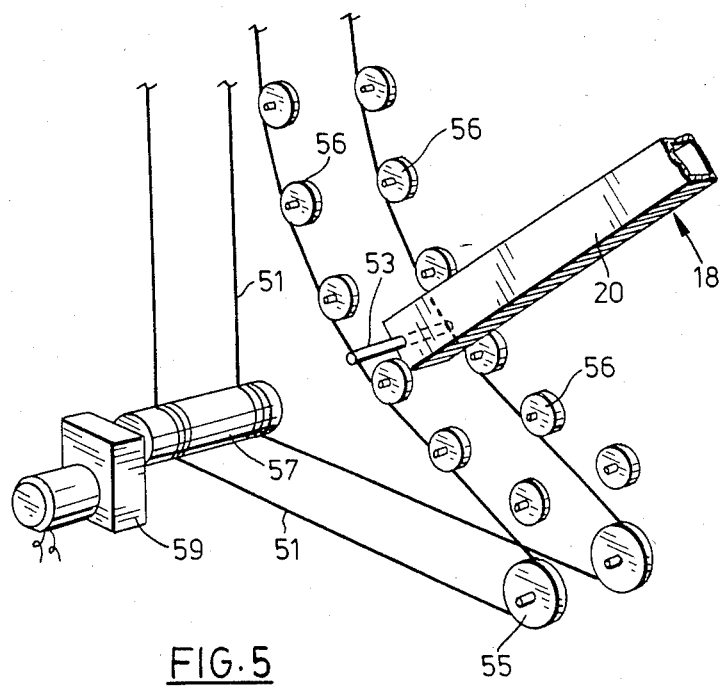
FIG. 5 is a perspective view of a detail of the arrangement shown in FIGS. 3 and 4.

A second preferred embodiment is shown in FIGS. 3-5 wherein the pontoons 15 are raised and lowered by means of a cable and pulley arrangement. As shown in FIG. 5, the end of the arm portion 20 is attached preferably to two cables 51, one on either side of the arm 18. As illustrated, this attachment to the cables 51 may be by means of a rod 53 passing through the arm portion 20 and attached to the cables 51, or by other means which will be apparent to the skilled person.

Each cable 51 is continuous and is arranged parallel to the other cable 51 about three fixed pulleys 55, a plurality of idling pulleys 56 and a fixed drum pulley 57. The idling pulleys 56 define the curved pathway to be traveled by the end of the arm portion 20 attached to the cables 51. The cables 51 are preferably steel such as stainless steel and are wrapped several times around the drum pulley 57. The drum 57 is driven preferably by a motor 59. Rotation of the drum pulley 57 causes the cables 51 to travel about the closed loop defined by the pulleys 55, 56 and 57.

Rotation of the drum pulley 57 in the counterclockwise direction as viewed in FIGS. 3 and 4 will cause the arm 18 to be rotated about the pivot 25 to lower the pontoon 15 to the operating position alongside the vehicle 10, whereas rotation of the drum 57 in the opposite or clockwise direction will cause the arm 18 to lift the pontoon 15 to the raised position, stowed atop the vehicle 10.

It will be apparent to the skilled person that a single motor 59 can be used in association with appropriate gearing and related drive means to rotate the drum pulleys 57 associated with both arms 18 attached to a pontoon 15. Alternatively, or as a back up, the drum pulleys 57 can be rotated by other means such as a hand operated crank or winch.

It is another feature of the invention that the pontoons 15 may be constructed of a first hard portion 61 and a second inflatable portion 62. This arrangement allows the pontoons 15 to be more compactly stowed atop the vehicle 10 and reduces the weight of the pontoons 15 significantly. The inflatable portion 62 of each pontoon 15 may be easily inflated by compressed air when the pontoons 15 are to be lowered for use in floating the vehicle 10. Conveniently, the compressed air may be stored in the hard portion 61 of the pontoon 15. The compressed air is preferably of sufficient pressure to inflate second portion 62 almost instantly.

I claim:

1. An amphibious vehicle having a front, a rear and two sides, comprising:
    a frame provided with wheels for transporting the vehicle on land;
    a body attached to the frame, the body having a watertight lower portion enabling the vehicle to float in a body of water;
    pontoons for the vehicle to provide flotation of the vehicle in a body of water, the vehicle having at least one pontoon positionable laterally along each side thereof;
    at least two pivoting arms for moving each pontoon from a stowed position atop the vehicle to an operating position alongside the vehicle, each arm having one end attached to the pontoon and the other end attached to two continuous cables positioned on either side of the arm, each cable being arranged about a plurality of pulleys in a parallel manner to define a curved path for movement of the end of the arm attached to the cable approximately 180° about a pivot so that the pontoon may be moved into the desired position; and means for causing the cable to move along the path defined by the pulleys.

2. A vehicle as claimed in claim 1, wherein the pulleys comprise fixed pulleys and idler pulleys, the idler pulleys defining a curved path for the movement of said other end of the arm about the pivot.

3. A vehicle as claimed in claim 2, wherein one of the fixed pulleys is a drum pulley having each cable wrapped several times around it, and the means for causing the cables to move is a motor which can rotate the drum pulley in alternative clockwise or counterclockwise directions so that the cables can move to raise or lower the pontoon.

4. A vehicle as claimed in claim 1, wherein the pontoons each comprise an inflatable member.

* * * * *